June 10, 1952  G. PETERSON  2,599,775
ELECTROSTATIC SEISMOMETER
Filed July 1, 1948  2 SHEETS—SHEET 1

INVENTOR.
GLEN PETERSON
BY Darby & Darby
Att'ys.

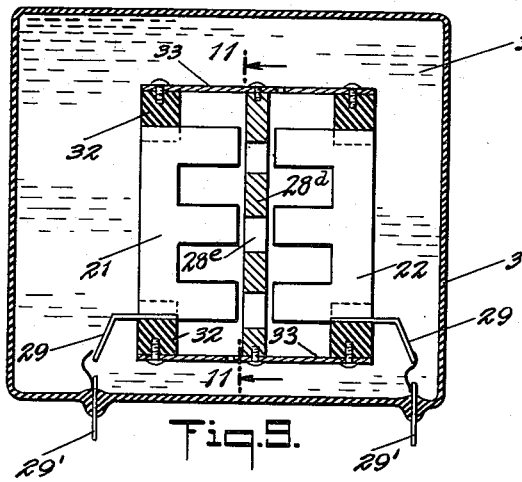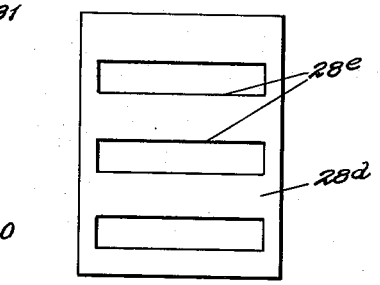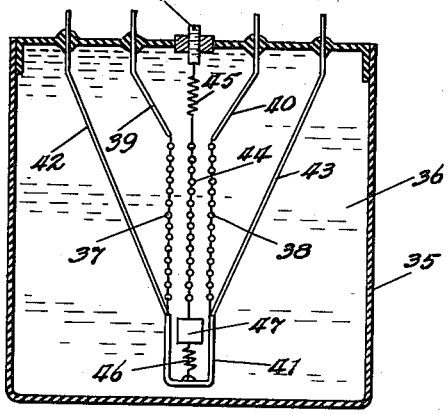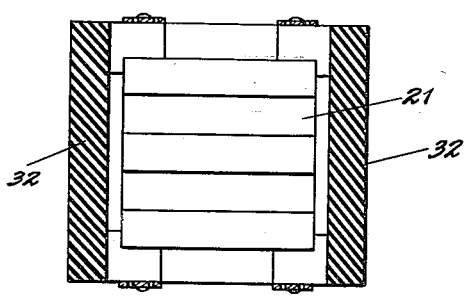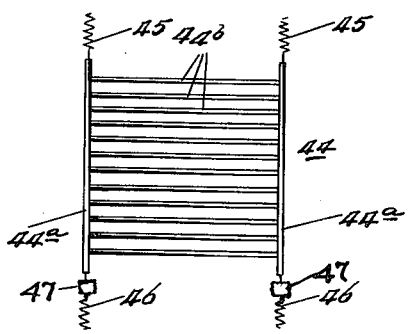
INVENTOR.
GLEN PETERSON

Patented June 10, 1952

2,599,775

UNITED STATES PATENT OFFICE 2,599,775

ELECTROSTATIC SEISMOMETER

Glen Peterson, Tulsa, Okla., assignor to Phillips Petroleum Company, a corporation of Delaware Application July 1, 1948, Serial No. 36,550

2 Claims. (Cl. 177—352)

This invention relates to improvements in seismometers and particularly to those of the electrostatic type.

An object of this invention is to provide a seismometer suitable to the direct modulation of a radio frequency carrier wave to provide a radio link between the point of incident seismic energy and the recorder, thereby replacing the cable link and magnetic seismometer therebetween as presently used, and thereby eliminating the well known disadvantages of a cable connection.

Another object of the invention is to provide a seismometer which by comparison with the more usual forms of this apparatus is small in size and light in weight.

A further object is to provide a seismometer of simple mechanical design and thereby adapted to economical manufacture.

A still further object of the invention is to provide a seismometer of improved sensitivity to seismic waves, which characteristic is obtained in part by the use of a specially designed electrostatic pick-up device.

An important object of this invention is to provide electrostatic seismometer structures in which for small displacements the ratio of variable capacitance to the total capacitance of the seismometer is high.

A further object of the invention is to provide a high impedance seismometer having a time constant suitable to accepted seismic exploration methods.

By using a radio link between the seismometer and the seismograph recorder in place of the usual cable connection there is permitted a reevaluation of the principles employed in the design and construction of the seismometer. With systems operated as at present employing long cables to carry the energy from the seismometer to the recording apparatus, a low impedance seismometer capable of feeding energy directly into the cable is generally desirable. With the system herein disclosed, omitting the cable link and employing a radio transmitter modulated by the seismometer, a high impedance seismometer becomes possible and desirable. This is particularly true and advantageously so with such forms of modulation as phase, frequency and various known types of pulse modulation which may be used.

A high impedance seismometer employing electrostatic elements has many advantages as will hereinafter appear, including that of great sensitivity. In seismic operations earth displacements used for exploratory purposes are frequently of a magnitude as small as $10^{-8}$ inches, and a seismometer having the inherent sensitivity to usefully employ such minute vibrations may when properly designed in accordance with the disclosure herein, be of the electrostatic or capacity type. Electrostatic seismometers of the type herein disclosed when associated with suitable electronic apparatus permit the useful absorption of earth motions of magnitudes as small as $10^{-8}$ inches. Motions of such minute magnitude are availed of in accordance with this invention by making the non-variable capacitance of the seismometer as low as possible and its variable capacitance as high as possible whereby maximum sensitivity is obtained.

Other and more detailed objects of the invention will be apparent from the following description of the embodiments described herein and illustrated in the attached drawings.

In the accompanying drawings:

Figure 9 is a cross-sectional view taken on the line 9—9 of Figure 10 of a modified form of electrostatic seismometer in accordance with this invention showing it immersed in a fluid;

Figure 10 is a top plan view of the seismometer of the combination of Figure 9 with the fluid housing removed and a part broken away;

Figure 11 is a cross-sectional view taken on the line 11—11 of Figure 9;

Figure 12 is a detailed plan view of one of the supporting springs for the movable dielectric member of this form of seismometer;

Figure 13 is a front elevational view of the movable dielectric member of this seismometer;

Figure 14 is an end elevational view of a still further modified form of electrostatic seismometer immersed in a fluid and showing the housing in cross-section; and Figure 15 is a detailed elevational view of the movable dielectric member of the seismometer of Figure 14.

Figure 1:
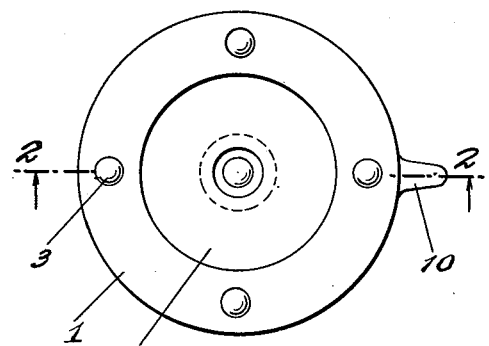
Figure 1 is a top plan view of an electrostatic seismometer in accordance with the invention herein disclosed.
Figure 2:
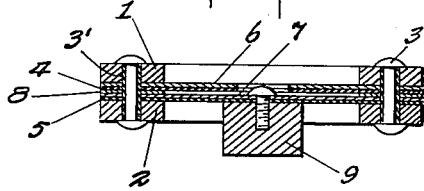
Figure 2 is a cross-sectional view taken on the line 2—2 of Figure 1.

Illustrated in Figures 1 and 2 is one form of electrostatic seismometer of sensitivity suitable to seismic exploration. As shown, it comprises a pair of insulating rings 1 and 2 clamping therebetween by means of the rivets or screws 3, a pair of insulating discs 4 and 5 which may be made of some material suitable to the purpose such as mica, cellophane, cellulose acetate and other plastic substances having the required electrical and physical properties. The discs 4 and 5 are respectively coated on their upper surfaces with the silver layers 6 and 7 respectively, which layers may be applied by any known method, but preferably by electrode deposition. Interposed between the composite discs 4—6 and 5—7 are the shims or washers 8 which predetermine the normal static spacing between the discs. While the silver coatings 6 and 7 have been shown on the upper faces of the discs 4 and 5, it will be understood that in some cases the coating may be on the lower face of disc 4. The disadvantage of this, however, is that under more intense vibration than would normally be expected the two coatings 6 and 7 might short circuit and interfere with the proper operation of the recording apparatus. The two silver coatings 6 and 7 extend radially as a part of the tabs 10 to make provision for electrical circuit connection thereto. As illustrated, the upper composite disc 4–6 has a central opening to provide for the movement therein of the head of a rivet or other attaching means to which a weight 9 of suitable proportions is suspended from the lower disc 5—7. As electronic engineers will appreciate, the coatings 6 and 7 must be insulated from each other, and therefore in addition to using insulating shims 8 the rivets 3 must be insulated from the coatings as by providing them with an insulating sleeve 3'.

By means of this construction there is provided the advantage that the metallic films 6 and 7 may be brought very close together, increasing the sensitivity of the device but preventing short circuit thereof by contact of one coating with the other. By means of this construction it is possible to separate the two discs by a distance as small as 0.001 inch, that is the thickness of the shim 8. By making the insulating disc 5 of very thin material it is possible to provide a total separation between the condenser plates 6 and 7, of as little as 0.0033 inch, so that a displacement of $10^{-8}$ inches will produce a variation in capacity of about 3 parts in a million. This variation is sufficient to effect phase or frequency modulation of a high frequency oscillator.

It can be shown that the instantaneous voltage developed by a capacitative seismometer such as that of Figures 1 and 2 is given by the relation $$\epsilon = ER\frac{C_0}{X_0}\frac{dx}{dt} \quad (1)$$

where E is the bias E. M. F. in volts applied to it, R is the load resistance in ohms, $C_0$ is the initial capacitance of the seismometer in farads, $X_0$ is the initial separation of the plates of the seismometer in inches and $$\frac{dx}{dt}$$

is the rate of change of the plate separation measured in inches per second. Thus if these values are $E=300$ volts, $R=10^3$ ohms, $C_0=100$ mmf., $X_0=0.003$ inch, $$\frac{dx}{dt}=\frac{10^{-8} \text{ inches}}{10^{-2} \text{ seconds}}=10^{-6}$$

inches per second then $\epsilon=10^{-3}$ volts which is the limiting value of the voltage developed for the given structure. This compares very favorably with about $10^{-5}$ volts for low impedance magnetic types of seismometers as now commonly used.

A somewhat more instructive relation than the equation given above can be drawn if one considers the electrostatic seismometer to be composed of two capacitors C and $\Delta C$ connected in parallel through a switch, and this combination connected in series with a battery E and a resistor R, where $\Delta C$ is that portion of the total capacitance that is variable with ground motion. Under these circumstances, it can be shown that the transient pulses of voltage developed by the seismometer have an amplitude:

$$\epsilon = E\frac{\Delta C}{C+\Delta C}e^{-\frac{t}{R(C+\Delta C)}}$$

or if $C'=C+\Delta C$ $$\epsilon = E\frac{\Delta C}{C'}e^{-\frac{t}{RC'}} \quad (2)$$

In both relations (1) and (2) it is seen that a seismometer structure having a low minimum capacitance (non-variable portion) is desirable. This is accomplished by means of the structure of Figure 1 and those to be hereinafter described.

In the structure of Figure 1, these desired conditions are attained by reducing the separation of the condenser plates 6 and 7 to a minimum so that $$\frac{dx}{dt}$$

of Equation (1) could be as large as possible in comparison with $X_0$.

Figure 3:
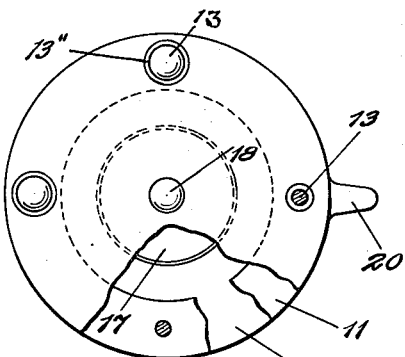
Figure 3 is a top plan view of a modified form of electrostatic seismometer with some parts broken away.
Figure 4:
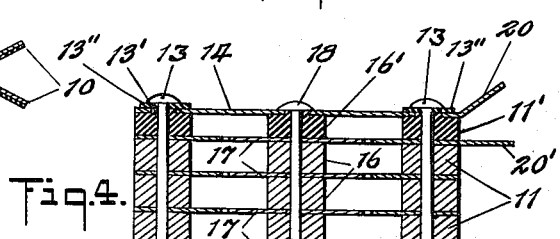
Figure 4 is a vertical, central, cross-sectional view of the structure of Figure 3.
Figure 5:
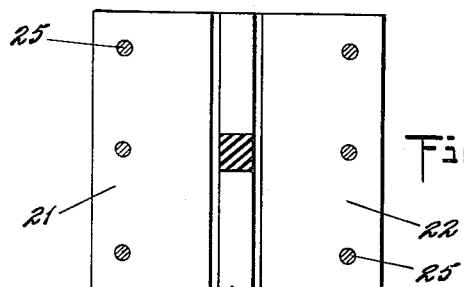
Figure 5 is a cross-sctional view taken on the line 5—5 of Figure 6 of still another form of electrostatic seismometer in accordance with this invention.

In the form of electrostatic or capacitive seismometer shown in Figures 3 and 4 the variable portion of $\Delta C$ is further increased in comparison with the fixed portion C. As illustrated, the device consists of a set of fixed parallel circular plates 12 separated by spacing rings 11 which are of conducting material, which set includes the terminal plates 14 and 15 spaced from the adjacent fixed plates 12 by means of spacer rings 11' which are of insulating material. All of these plates and rings are secured together by a series of rivets or bolts 13 which are conductively in contact with the plates 12 but are insulated from the plates 14 and 15 by means of bushing 13' which may be integral with the insulating rings 11" or may be separate insulating bushings. The heads of the rivets 13 are insulated from the plates 14 and 15 by means of insulating washers 13" as shown. The fixed plates 12 are provided with axially aligned concentric openings in which a set of movable plates 17 are mounted so that their peripheral edges are slightly spaced radially from the annular walls defining the openings in the fixed pates 12. The plates 17 are separated by conducting spacers 16 which are secured together and to the end plates 14 and 15 by means of a riveting of fastening device 18 which also serves to attach to the resulting movable system a properly proportioned weighting member 19.

The terminal spacers 16' are indicated as being of insulating material but they too can be of conducting material as the plates 14 and 15 are insulated as previously described from the fixed plates 12. The plate 14 is provided with a terminal connecting tab 29 and one of the plates 12 is provided with a similar tab 29' so that the plate groups 12 and 17 are electrically connected in groups of which the plate group 17 is relatively movable with respect to the plate group 12 under the control of the spring action produced by the end plates 14 and 15. It will be understood that the movable plates 17 are electrically connected to the fastening device 18 and to the spring mounting plates 14 and 15. In normal relaxed position the movable plates 17 lie in the planes of the fixed plates 12, as shown in Figure 4. Thus the plates of the movable set are placed edge to edge with the plates of the fixed set so as to get the greatest change in capacity for given relative movements between the two sets of plates. This, of course, is in comparison with the normal fixed capacity C of the combination. As a result $$\frac{\Delta C}{C'}$$

in Equation (2) is made as large as possible. To further increase this factor of the equation the plates 12 and 17 are made very thin.

In the case of both structures the weights 9 and 19 are so selected as the particular characteristics of each assembly requires, so that the moving portion thereof is given the desired period of motion with respect to the other.

The construction of Figures 5 to 8 inclusive has the general electrical characteristics explained above as desirable for a capacitive seismometer but structural differences from the modifications previously described. In this case there is provided a pair of fixed conductive members 21 and 22 which for the sake of simplification are shown in cross-section as E-shaped. Attached to the opposite ends thereof are the pairs of insulating strips or blocks 23 and 24 and the spring supporting members 26 and 27. The conductor members 21 and 22, the spacers 23 and 24, and the spring supporting members 26 and 27 are secured together in stacked and spaced relation as clearly shown in Figure 6, by means of rivets or bolts 25. Included in each stack are the terminal tabs 29. The spring members 27 which may be constructed like that illustrated in Figure 12, or may be simply continuous thin strips of spring metal serve to support between them a movable member consisting of a plate of dielectric material composed of alternate sections 28 and 28' of different dielectric properties. Preferably the sections 28' should have a higher dielectric constant than the sections 28. It will be appreciated that when this structure is subjected to vibrations the member will oscillate in a vertical plane to vary the dielectric characteristics of the gap between the arms of the conducting E members 21 and 22 and thereby change the capacity of the condenser that is thus formed by the conductor members 21 and 22. The member 28 is a rectangular plate built up of alternate laminations of strips 28 and 28' as will be understood from this description.

Figure 6:
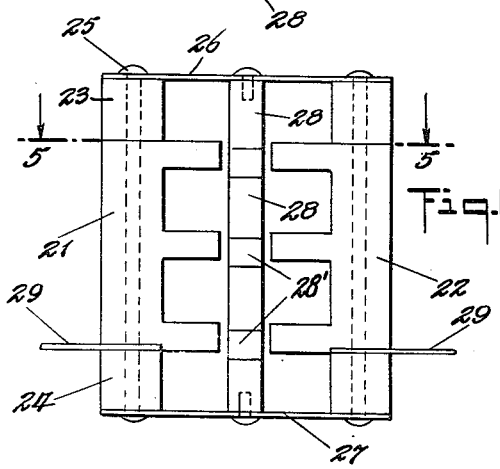
Figure 6 is a side elevational view of this modification.
Figures 7, 8:
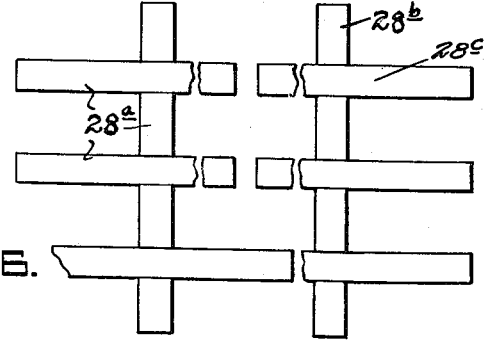
Figures 7 and 8 are elevational views of modified forms of movable dielectric members for the structures of Figures 5 and 6.

The movable member may, however, take the forms illustrated in Figures 7 and 8. The structure of Figure 7 consists of a member 28ª of the configuration shown and composed of a dielectric material of uniform dielectric constant throughout its structure. It will be supported between the springs 26 and 27 in the same manner as in the member 28, with the result that the cross arms will take the positions in the view of Figure 6, that the bars 28' have. In this case, therefore, with the exception of the vertical bar of the member 28ª which connects the horizontal bars, the gaps between the arms of the conducting members 21 and 22 will be composed partially by air and partially by the dielectric material of the horizontal arms. Thus in effect the member 28ª will have the characteristics of the member 28 of creating a condition of relatively high and low dielectric capacity so that vertical vibration thereof will cause a similar change in the variable component of the capacity of the condenser structure. To put it more concisely, with the structure of Figure 7 air has been substituted as the dielectric material for that of the bars 28 except at the center of the member 28ª at which the vertically connected bar lies. In the structure of Figure 8 the features of the two previous movable members are combined. In the structure of Figure 8 the horizontal bars 28ᶜ are made of material of a higher dielectric constant than the material of the vertical bar 28ᵇ, thus in part at least the characteristics of both of the previous structures are provided by the structure of Figure 8.

It will be understood, as is clear from the other forms of the device disclosed, that the number of projections on the stator members 21 and 22 and the cooperating arms on the member 28 may be increased with due regard to the requirement in accordance with this invention that the variable factor of the total capacitance of the device shall be large with respect to the fixed capacitance thereof.

A still further form of structure is illustrated in Figures 9 to 13 inclusive. In this case, as before, a pair of fixed E-shaped conducting members 21 and 22 are placed in opposed relation and assembled in that relation by means of the insulating spacers 32 which are of U-shaped form, as shown in the various figures, and provided with seats for the conducting members 21 and 22. These parts are secured together to hold the members 21 and 22 in parallel spaced relation and to secure the springs 33 thereto. The springs 33 are provided with struck-out fingers 34 which are secured to the opposite ends of the member 28ᵈ. This member, as clearly shown in Figure 13, consists of a slight rectangular plate of insulating material having a low dielectric constant and provided with a series of rectangular windows or openings 28ᵉ aligned with respect to the arms of the conducting members 21 and 22 so that the material of the member partly overlaps the aligned areas of these arms and the remaining areas are separated by the air spaces provided by the windows 28ᵉ. The terminal tabs 29 are respectively connected to a pair of lead-in wires 29' which are mounted in a suitable housing 30 containing a fluid 31 of high dielectric constant, many of which are well known and suitable for the purpose. In the form illustrated the housing 30 being of insulating material, the lead-in wires 29' can be directly mounted therein. If the housing is of conducting material then suitable insulators for the lead-in wires 29' will be provided.

With this arrangement the spring fingers 34 provide greater vertical flexibility than would be provided by the arrangement of Figure 6, where the spring members 26 and 27 are continuous strips of spring metal.

It will be apparent that the moving portions of the structure of Figures 6 and 9 can be provided with weights as before to adjust the period of vibration thereof. It will also be understood that the structure of Figure 9 will be provided with suitable vent openings so as to permit the proper movement of the insulating fluid 31 as the structure vibrates, although in view of the very small movements of the structure the openings around the spring fingers 34 will normally be adequate.

A preferred form of electrostatic or capacitive seismometer is illustrated in Figures 14 and 15. It consists of a housing 35 of similar material containing a fluid 36 of a high dielectric constant in which the seismometer elements are immersed. These elements consist of a pair of grids 37 and 38 which are supported from a wall of the housing by means of rods or wires 39, 40, 42 and 43 so that these grids are supported from both ends and in parallel spaced relation, as shown. The spacing at the lower ends is further maintained by means of yokes 41 at each side of the grids. The supporting wires or rods 39, 40, 42 and 43 also provide suitable circuit connection leads for the device which pass to the exterior of the housing directly therethrough if it is of insulating material or at the insulating and welling bushings (not shown) if it is of conductive material.

Suspended between the grids 37 and 38 is the movable grid 44 corresponding to the moving element of the other devices and suspended by four springs 45 and 46 (see Fig. 15). Attached to the movable grid at the bottom is a suitable weight 47 to impart the proper periodicity to the grid. Each of the grids 37, 38 and 44 is constructed like that illustrated in Figure 15 and each comprises a pair of side bars like the bars 44$^a$ connected by a series of parallel cross bars 44$^b$. The element 44 is insulated from the housing 35 if it is of metal. This type of structure has the virtue of lightness and the grids can be relatively arranged so that the non-variable portion of the capacity is kept relatively low.

The grid structure illustrated in Figures 14 and 15 is particularly adapted to accomplish the object of this invention because the movable grid can be made very light so as to be very sensitive to small earth movements and the ratio of variable capacitance to fixed capacitance can readily be made large.

From the above description it will be apparent to those skilled in the art that the subject matter of this invention is capable of considerable variation, and I do not, therefore, desire to be strictly limited to the disclosure which has been given for illustrative purposes, but rather by the claims granted me.

What is claimed is:

1. A capacitive seismometer comprising a set of fixed spaced conductors in the form of flat rings, a second set of spaced conductors in the form of discs, means for resiliently supporting said second set of conductors with their outer edges in alignment with the inner edges of said first set and means for electrically connecting said sets of conductors into two separate groups, whereby the ratio of variable capacitance to fixed capacitance of the seismometer is large.

2. In the combination of claim 1, a weight secured to said second set of conductors to impart the desired periodicity thereto in relation to the resilient mounting therefor.

GLEN PETERSON.

REFERENCES CITED

The following references are of record in the file of this patent:

UNITED STATES PATENTS

| Number | Name | Date |
| --- | --- | --- |
| 2,041,710 | Hayes | May 26, 1936 |
| 2,257,187 | Owen | Sept. 30, 1941 |
| 2,367,017 | Gardiner | Jan. 9, 1945 |
| 2,368,278 | Warshaw | Jan. 30, 1945 |
| 2,414,886 | Miessner | Jan. 28, 1947 |

FOREIGN PATENTS

| Number | Country | Date |
| --- | --- | --- |
| 509,783 | Great Britain | July 20, 1939 |